United States Patent [19]

Tucker

[11] Patent Number: 5,504,663
[45] Date of Patent: Apr. 2, 1996

[54] CONTAINER ADAPTED TO INCLUDE A LIGHT SOURCE

[75] Inventor: Gale F. Tucker, Las Vegas, Nev.

[73] Assignee: Progressive Specialty Glass Co., Southington, Conn.

[21] Appl. No.: 492,944

[22] Filed: Jun. 21, 1995

Related U.S. Application Data

[63] Continuation of Ser. No. 103,259, Aug. 6, 1993, abandoned.

[51] Int. Cl.$^6$ ....................................................... F21V 33/00
[52] U.S. Cl. ........................... 362/101; 362/190; 206/217; 220/376
[58] Field of Search ........................... 362/101, 154, 362/267, 310, 190; 119/266; 206/157, 217; 220/376, 212, 227, 228; 127/539, 515; D9/307, 434, 441, 454

[56] References Cited

U.S. PATENT DOCUMENTS

| | | | |
|---|---|---|---|
| 2,224,319 | 12/1940 | Schroyer | 215/99.5 |
| 3,834,351 | 9/1974 | Schmidt | 362/101 |
| 5,178,450 | 1/1993 | Zelensky et al. | 362/101 |

FOREIGN PATENT DOCUMENTS

| | | | |
|---|---|---|---|
| 672273 | 2/1939 | Germany | 215/99.5 |
| 2731363 | 1/1979 | Germany | 119/266 |

*Primary Examiner*—Ira S. Lazarus
*Assistant Examiner*—Sara Sachie Raab
*Attorney, Agent, or Firm*—Paul R. Audet

[57] ABSTRACT

Containers or closures, preferably for liquids, are provided having means for holding a light source for illuminating the containers, preferably the interior of the containers. The holding means can be associated with any portion of the container, including its closure, body, side wall(s), handle, or bottom, which can include a base portion or bottom extension. The holding means can include an opening defined by a ledge in the closure, or it can include a housing which can extend upwardly or downwardly from the closure, or bottom or bottom extension. At least a portion of the container which is between the light source and the interior of the container is a least partially transparent to light.

18 Claims, 12 Drawing Sheets

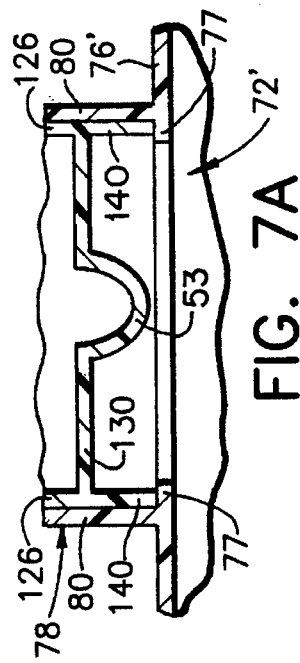
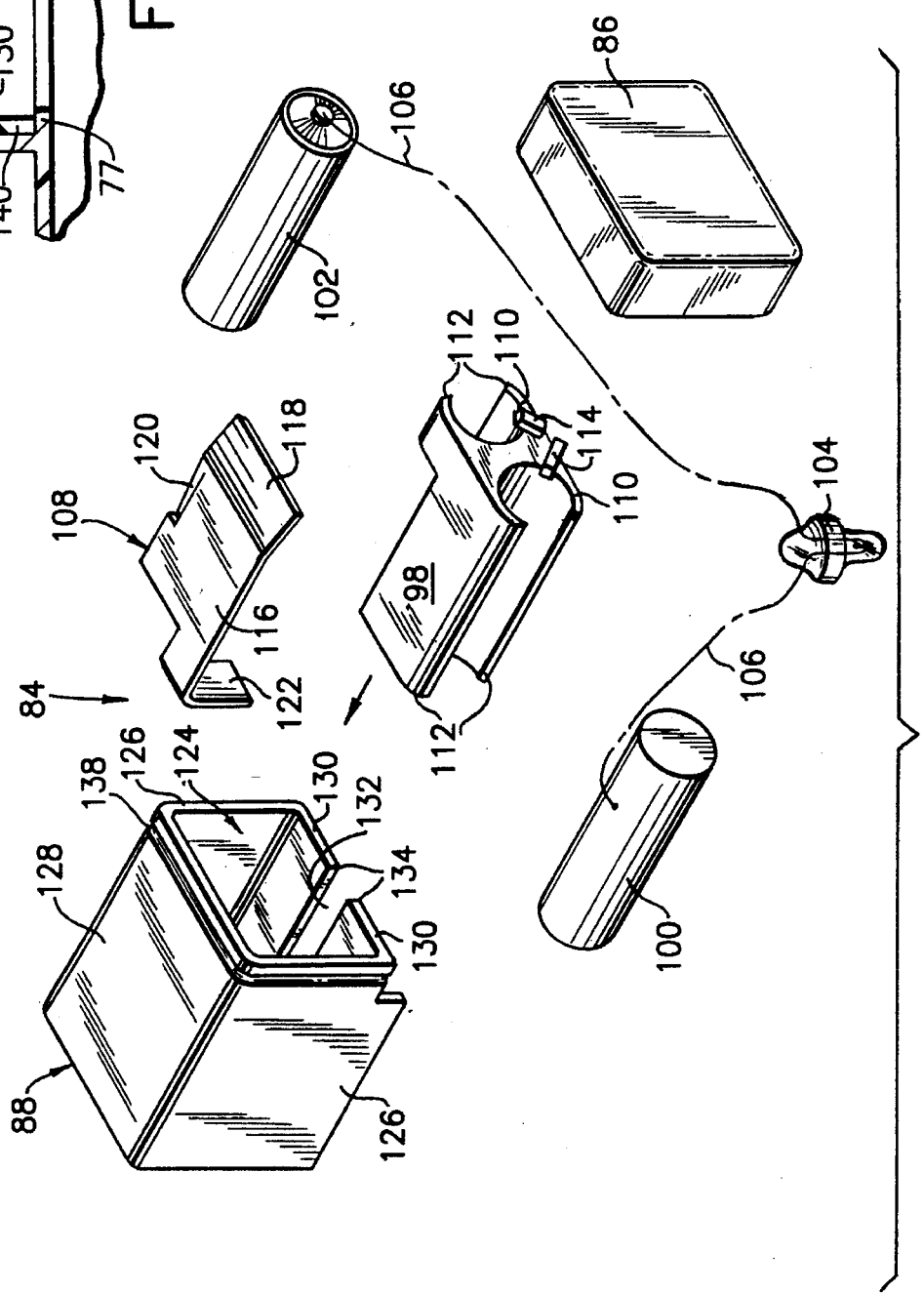

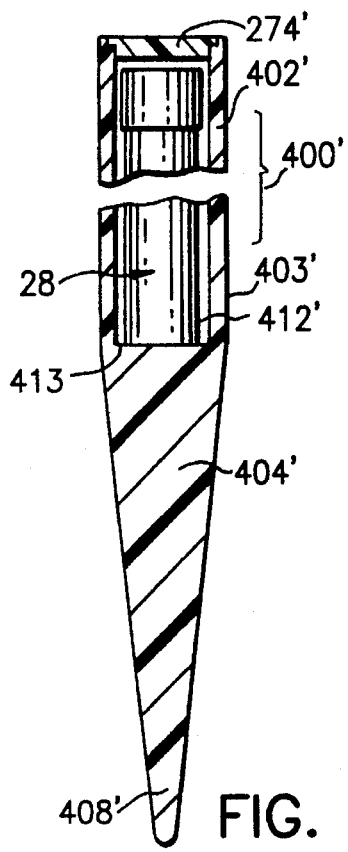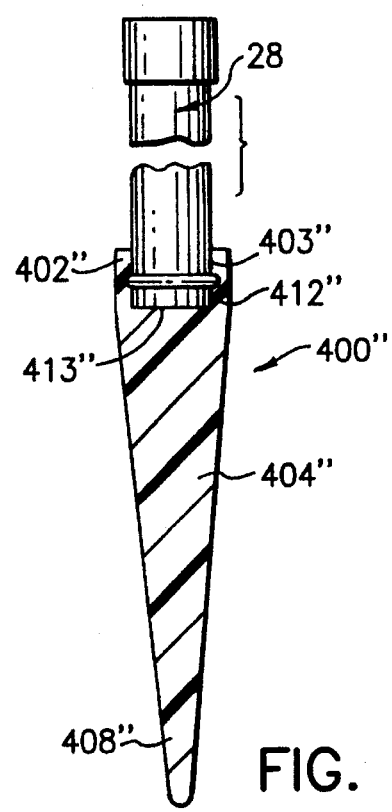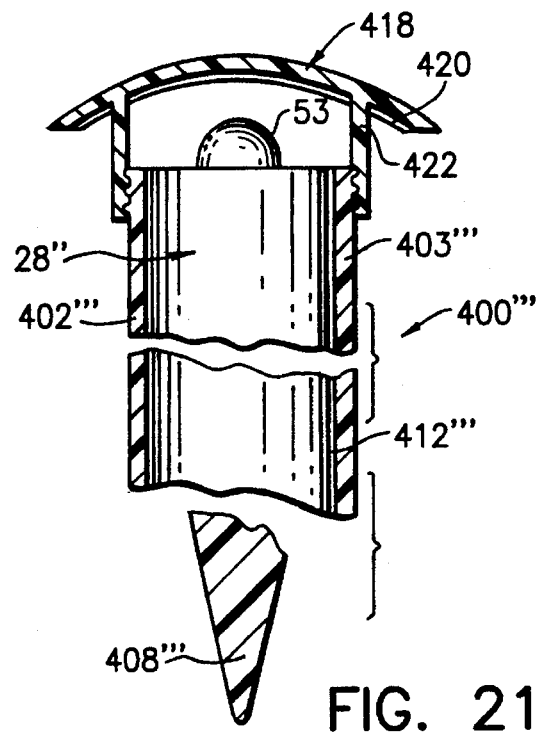
FIG. 19
FIG. 20
FIG. 21

CONTAINER ADAPTED TO INCLUDE A LIGHT SOURCE

This is a continuation of application Ser. No. 8/103,259 filed on Aug. 6, 1993 now abandoned.

BACKGROUND OF THE INVENTION

This invention relates to containers, more particularly to containers for drinking liquids, and to closures for such containers.

Drinking containers and closures therefor are well known. Sources of light of various types for example, combinations of batteries and light bulbs with conductors therebetween, are also well known.

It would be desireable to have containers, preferably for consumable products, especially containers for holding drinkable liquids, and closures for such containers, wherein the containers and/or closures have associated therewith a source of light for illuminating the container or closure, preferably the interior of the container, especially when it contains a liquid.

SUMMARY OF THE INVENTION

This invention is directed to a container or closure for a container, wherein the container or closure includes means for holding a light source to illuminate the container, preferably the interior of the container or closure. The holding means can be associated with, attached or secured to, or part of or formed of or in any suitable portion of the container. The container may include a closure therefor, and includes a bottom and possibly an extension thereof, for example, a base portion integral with or connected to the bottom, a side wall, and possibly a handle. Preferably, the holding means includes housing which may include a chamber or cavity for housing or holding the light source therein. The housing can extend in any suitable direction, for example, upwardly or downwardly from the closure, bottom wall or a bottom extension. The housing can also be included as part of and can extend from any wall of the container, including from a side wall. When the container includes a handle, the handle can include the holding means, preferably a housing, located in the vertical or a roughly horizontally portion of the handle. The container or light source can have a flexible or moveable portion which can be moved to activate the light source.

In the preferred closure, the holding means includes an opening in the closure and a rim or ledge which defines the opening, so that the light source depends downwardly toward the inside of the container. The closure can have a central panel which can include the holding means. The container, closure, central panel and holding means can be of any suitable shape, configuration, dimension or position. In the preferred closure, the holding means is elevated above the rim of the container when the closure is secured thereto, and the central panel is frustoconical wherein its smaller diameter top end portion includes the holding means. The housing wherever located or positioned can have an opening in lieu of or in any of its walls for ingress or egress of the light source. When there is a portion e.g. of a wall of the container or closure between the interior thereof and the light source, at least a portion of the interstitial portion or wall preferably is at least partially transparent to light.

BRIEF DESCRIPTION OF THE DRAWINGS

FIG. 6 is an exploded view of a light source utilizable with the container or closure of the invention.

FIG. 7A is an enlarged vertical section, with portions broken away, as would be taken along line 7—7 of FIG. 5, showing an alternative embodiment of the closure of FIG. 7A.

FIG. 19 is a vertical section, with portions broken away, through another embodiment of the container of this invention.

FIG. 20 is a vertical section, with portions broken away, through another embodiment of the container of this invention.

FIG. 21 is a vertical section, with portions broken away, through another embodiment of the container of this invention.

DETAILED DESCRIPTION OF THE INVENTION

Figure 1:
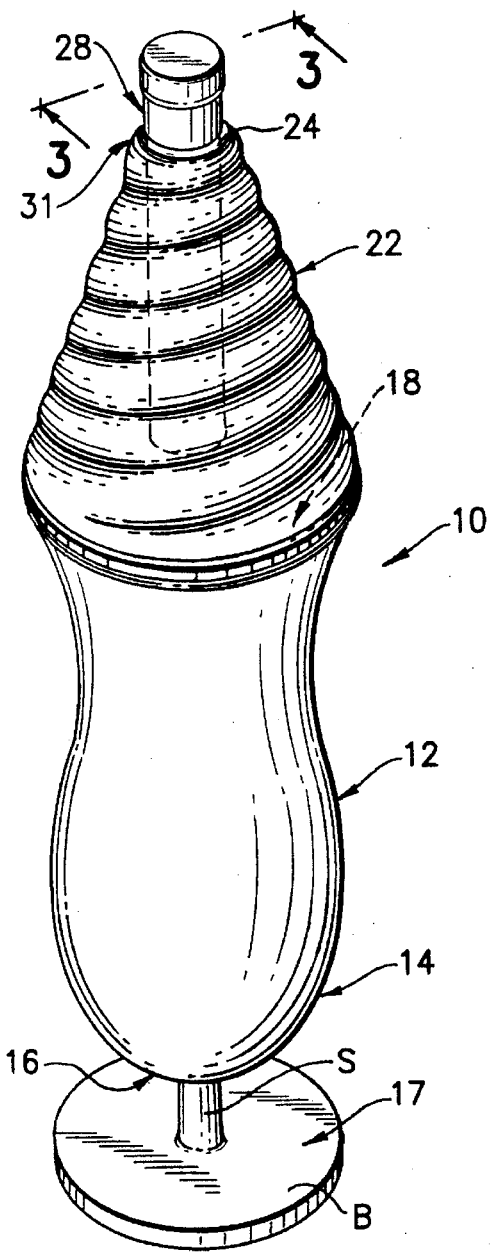
FIG. 1 is a perspective view of a preferred embodiment of the container of the invention.

FIG. 1 shows a container of this invention, generally designated 10, comprised of a side wall 12, a bottom, generally designated 14 which includes a bottom wall 16, and a bottom extension or base portion 17 which in turn includes a base B and a stem S. The container is also comprised of an open top end 18 defined by a rim 20 (FIG. 3), for attaching a closure 22 to the container, to close its open end. The open end communicates with the container interior, here, cavity 19, preferably for holding liquids, especially drinkable liquids (not shown).

Figure 2:
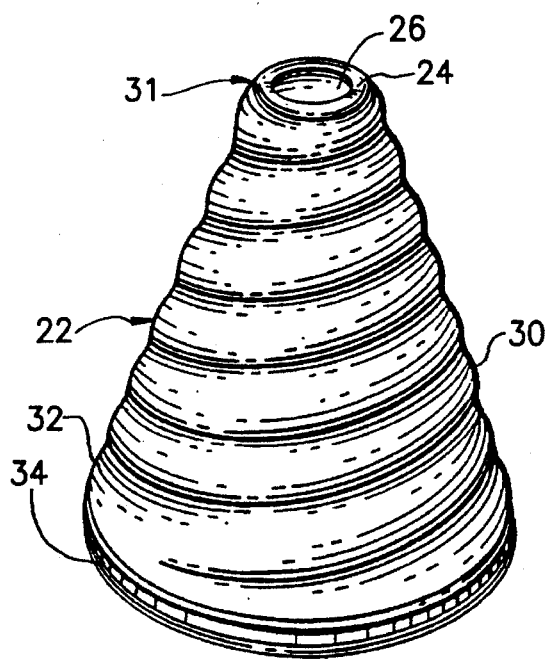
FIG. 2 is a perspective view of a preferred embodiment of the closure of the invention.

In accordance with the invention, the container 10, or closure 22, includes means, here generally designated and shown in FIGS. 1 and 2 as closure ledge 24 which defines an opening 26, for holding a light source or lighting device, generally designated 28, to illuminate the the container, preferably the interior of the container. Although the closure can be of any suitable shape, FIGS. 1 and 2 show a preferred embodiment wherein the closure 22 has a central panel portion 30 which is frustoconical in shape, with its top end portion 31 having a smaller diameter than its lower end portion 32, which in turn has suitable means such as a peripheral bead 33 in rim 34, (FIG. 3) for receiving container rim 20 and thereby friction holding or attaching the closure to the container. In FIG. 1, the closure has a swirling, threadedly undulating shape like that which is characteristic of the soft ice cream of an ice cream cone.

Figure 3:
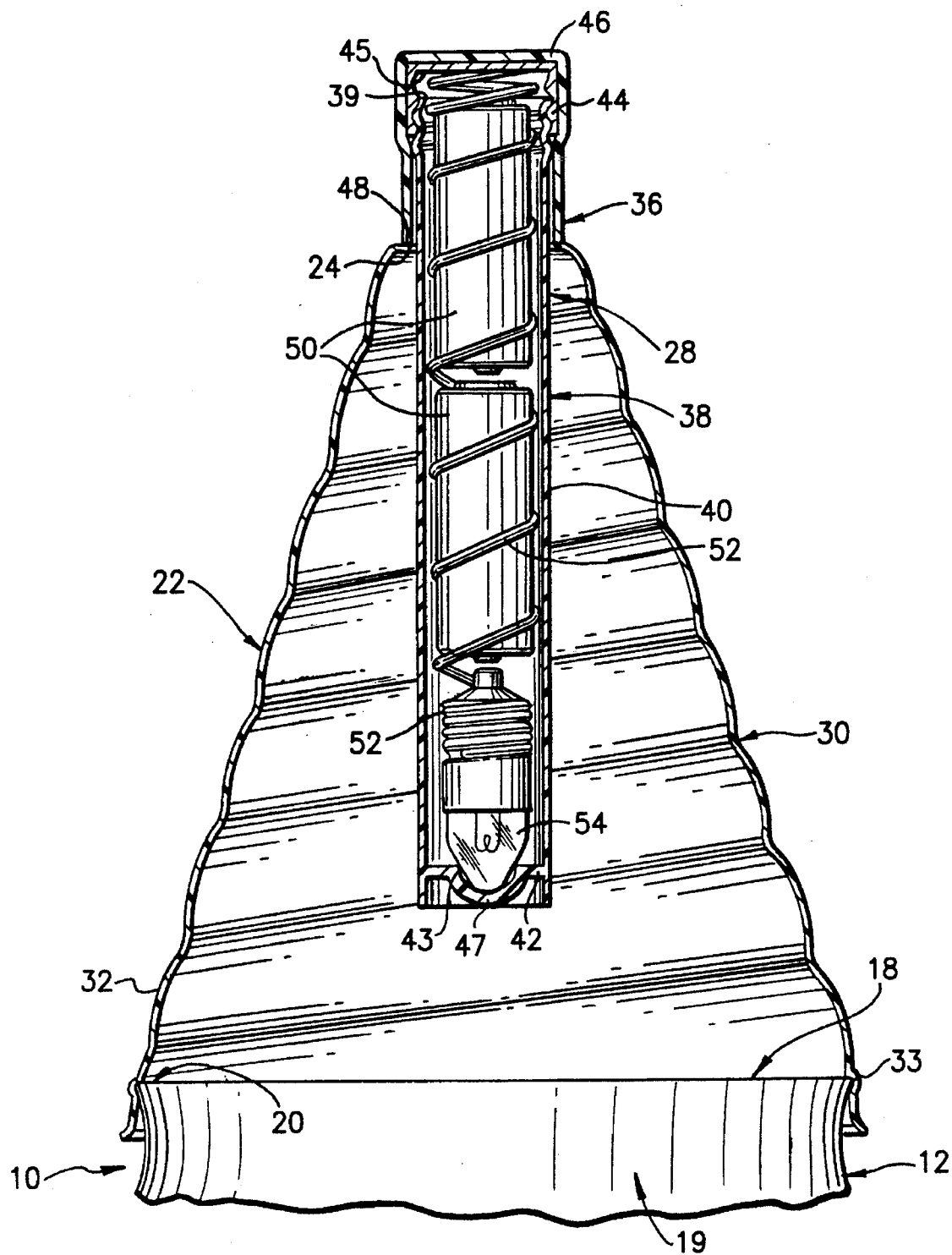
FIG. 3 is an enlarged vertical section, with portions broken away, as would be taken along line 3—3 of FIG. 1.

FIG. 3, an enlarged vertical section taken along line 3—3 of FIG. 1, shows closure 22 attached to container and shows light source 28 held or supported by the holding means to illuminate the inside of the closure and container. More particularly, FIG. 3 shows the light source 28 in the form of a relatively small elongated flashlight 35 which in this embodiment is comprised of a case 38 having a side wall 40 and a lower end wall 42 having an opening therein defined by an edge 43 and closed by a bulbous portion 47 which is transparent. The top end portion of the side wall is threaded and has a threaded metal inner cap 44 screwed thereonto. The flashlight also has an overcap 46, preferbly of a polymeric or elastomeric material, which preferably lies in a tight, non-slip fit over metal cap 44, and depends in a tight slip-fit over a portion of the top end portion of case 38. The bottom edge 48 of the overcap protrudes beyond the diameter of flashlight case 38, rests on closure ledge 24 and is thereby gravity held in position by the holding means of the container closure. The flashlight case includes lighting means, here shown as including two small-sized end cell batteries 50, positioned end-to-end and surrounded by the metal wire of an elongated coil spring 52 which is in communication with light bulb 54. The coil spring fits tightly about the batteries and base of the bulb 54, and, as shown in its unbiased condition, friction holds the batteries and bulb basically in the spaced position shown such that the protruding post of the lower battery does not touch the contact at the base of lightbulb 54 which rests against lower end wall edge 43. The flashlight is assembled so that there is a gap between the top edge 39 of case 38 and the inner surface of the top wall 45 of inner cap 44, and at least one other gap, e.g between batteries 50 and/or between the lower battery and bulb 54. To light bulb 54, overcap 46 is grasped adjacent its top end, and it and inner cap 44 are turned clockwise. This screws and moves inner cap 44 downwardly over the threaded portion of case 38, thereby biasing coil spring 52 and batteries 50 downward, and closing the gaps between the batteries and bulb. When the batteries and bulb are in contact, the circuit therebetween is completed and bulb 54 is energized. All or a portion of case lower end wall 42 and the extended legs of side wall 40 can be at least partially transparent to light. Light from bulb 54 passes directly from its tip, and also preferably through case lower end wall 42 through the container open top end portion 18 into the interior of container 10.

Figure 4:
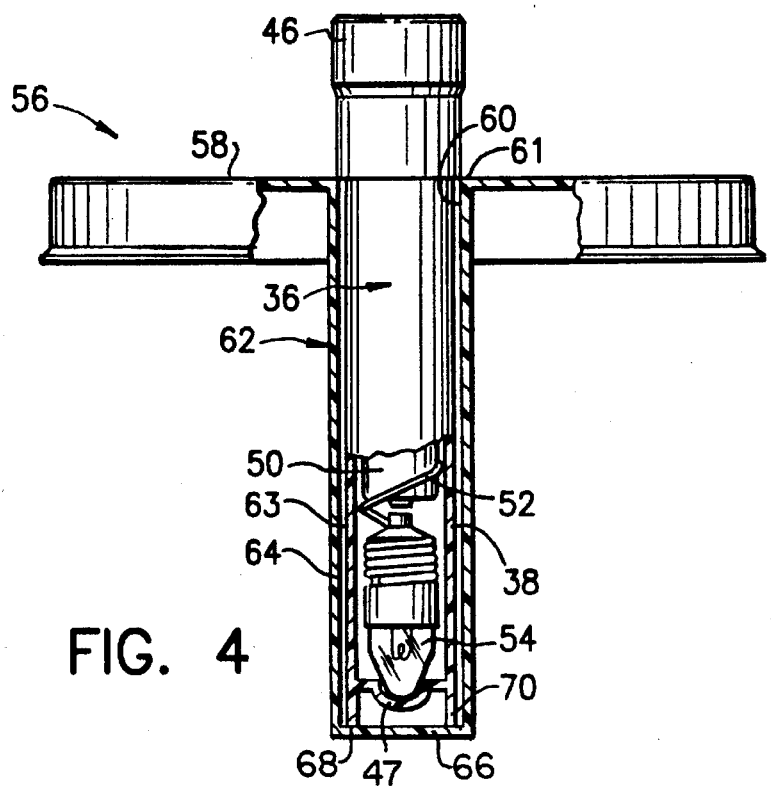
FIG. 4 is a side elevational view, with portions in vertical section, of another embodiment of the closure of the invention.

FIG. 4, a side elevational view of another embodiment of the closure of this invention, shows a closure, generally designated 56, which includes a central panel 58 having an opening 60 therein defined by a ledge 61, and having means for holding a light source here shown in the form of a downwardly depending housing 62 having walls, here a cylindrical side wall 64 which has an upper end portion in communication with opening 60 and a lower end portion, and bottom wall 66, which define a chamber 63, the housing having a top open end which communicates with and is at least partially comprised of the closure opening. In this embodiment, the light source 28 can be elongated flashlight 36 as shown in FIGS. 1 and 3. The flashlight is merely dropped into the upper open end of the housing and the bottom edges 68 of legs 70 of flashlight case 38 rest on and are supported by housing bottom wall 66. In this embodiment, the diameter or size of the opening and chamber are slightly larger than that of overcap 46. However, the diameter or size of opening 60 can be smaller such that, as in FIGS. 1 and 3, central panel ledge 61 can support the bottom edge 48 (not shown in FIG. 4) of overcap 46 to thereby support and hold the flashlight. If the light source is so supported bottom wall 66 of housing 62 can be eliminated. All or a suitable portion of the housing side wall and/or especially the bottom wall can include a portion which is at least partially transparent to light to allow light from the flashlight to be directed downwardly into she container to illumine the interior of the container when the closure is attached to a container to substantially close its open end.

Figure 5:
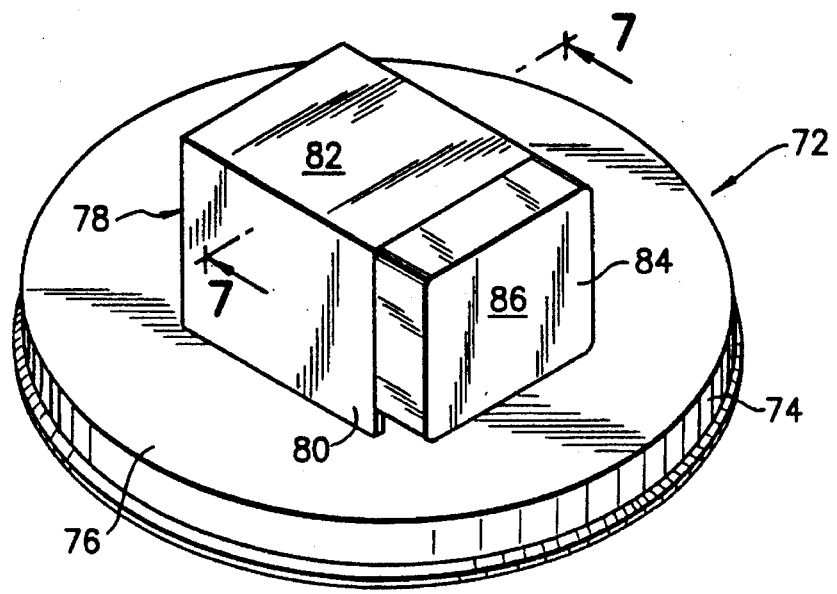
FIG. 5 is a perspective view of another embodiment the closure of the invention.

FIG. 5 shows another embodiment of the closure of this invention, here generally designated 72, having a rim 74 and a central panel 76, a portion of which is associated with the means for holding a light source, here shown as an upwardly extending housing 78. The housing has upwardly extending side walls 80 which can be integral with or secured to central panel 76 and in this embodiment, to a top wall 82. As shown in FIG. 5, the side walls have a rim which defines an opening in the housing above the central panel, the opening being adapted to removably receive a light source therethrough. The housing may or may not have a rear wall, as desired. As will be explained in connection with FIGS. 6–8, housing 78 is adopted to removably receive through the opening and has seated therein at least a portion of another embodiment of a light source such as a flashlight 84 whose cover 86 is shown in FIG. 5.

FIG. 6, is an exploded view of flashlight 84 of FIG. 5, showing that the flashlight is comprised of case 88, cover 86, and lighting means in the form of an assembly comprised of a battery holder 98 for batteries, 100, 102, light bulb 104, wires 106 extending from the filament of the bulb respectively in contact with, e.g. welded to the positive post of battery 102 and with the exposed conductive side wall of battery 100, and conductive member 108. Battery holder 98 can be formed of plastic or a similar resilient, insulating material and has opposed seats 110 each having a channel formed in part by an arcuate surface formed in the body's pair of opposed arms 112 which extend greater than one-half of the circumference of the battery they hold. Battery holder 98 also includes two integral retaining lugs 114 for holding the ends of the batteries in seat 110. Batteries 100, 102 are inserted into seats 110 against lugs 114. Conductive member 108 is made of resilient, conductive material such as copper, and is comprised of a slightly upwardly angled main plate portion 116, an integral downwardly angled main section plate 118, a depending integral switch arm 120, and leg 122 depending from the back end of main plate portion 116. The conductive member fits over battery retaining member 98 after the batteries are seated therein, such that leg 122 contacts, preferably is fastened to, the positive post of battery 100, and such that the main plate portion 116, downwardly angled main section 118, and the tip of switch 120 are spaced from the batteries and battery holder. In the embodiment, light bulb 104 is located on the underside of battery holder 98, which can have a hole or indentation therein 123 (FIG. 7) to locate and receive the base of bulb 104. Wires 106 are stiff enough to hold the bulb in such position wherein its tip points downward substantially vertically away from battery holder 98. The battery holder and conductive member assembly are inserted into case 88, which has side walls 126, top wall 128, end wall 129 (FIG. 8), and bottom wall 130 having a slot or gap 139 therein or therebetween, defined by edges 134. The slot extends far enough into the length of the bottom wall 130 as to receive bulb 104 in a manner shown in FIGS. 7 and 8 herein. Although end wall 129 can be omitted, it is preferred in this embodiment for forcing leg 122 against the post of battery 100 if the leg is not fastened thereto. The inner surfaces of walls 126, 128 and 130 form a cavity wall 124 which preferably but need not form, a tight fit with the assembly. The fit is tight enough that the mere insertion of the assembly into case 88 forces conductive member main plate 116 downward towards battery holder 98 such that the tip of switch arm 120 contacts the unprotected outer surface of battery 102 and completes the circuit between the batteries and bulb, thereby energizing bulb 104.

With this design, the bulb remains lit when the assembly is in case 88 and when the case is inserted into housing 78. In an alternative design of the case and assembly, the fit is looser such that insertion of the assembly into case 88 does not light bulb 104. In such instances, one of the case walls, here, top wall 128 can be made of generally flexible material such that when case 88 is inserted into a tight fit into housing 78 and housing 78 has a substantially rigid structure, the tight fit compresses flexible case top wall 128, and this forces switch arm 120 against the battery 102 to thereby close the circuit and illumine the bulb. In still another approach, the fit of the assembly in case 88 and of case 88 in housing 78 are not so tight as to compress switch arm 120 against battery 102. In such embodiments, each of the respective top walls, of case 88 and of housing 78, are generally flexible such that finger pressure on housing top wall 82 compresses it along with case top wall 128 to thereby cause switch are 120 to contact battery 102 and thereby energize bulb 104. Release of the pressure opens the circuit and turns off the light.

Figure 7:
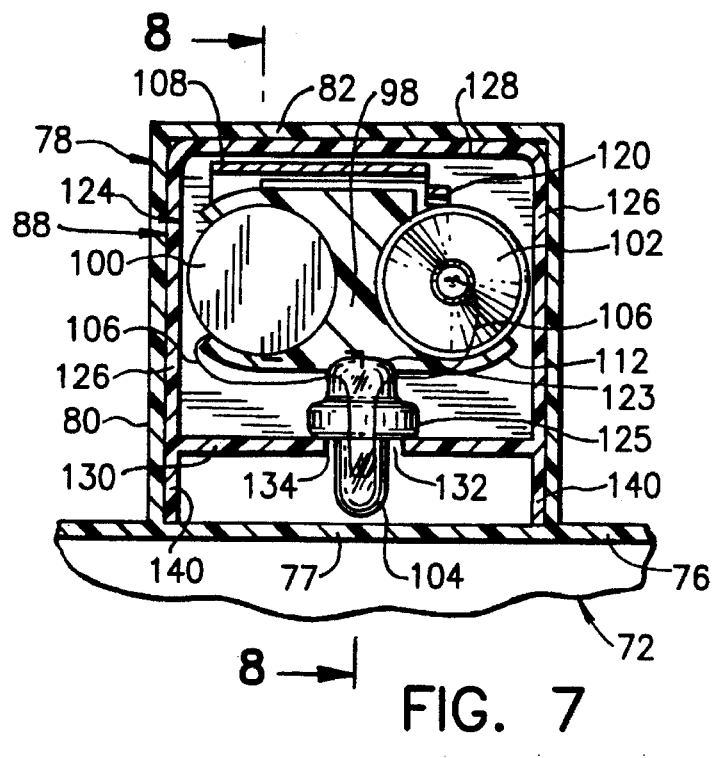
FIG. 7 is an enlarged vertical section, with portions broken away, taken along line 7—7 of FIG. 5.
Figure 8:
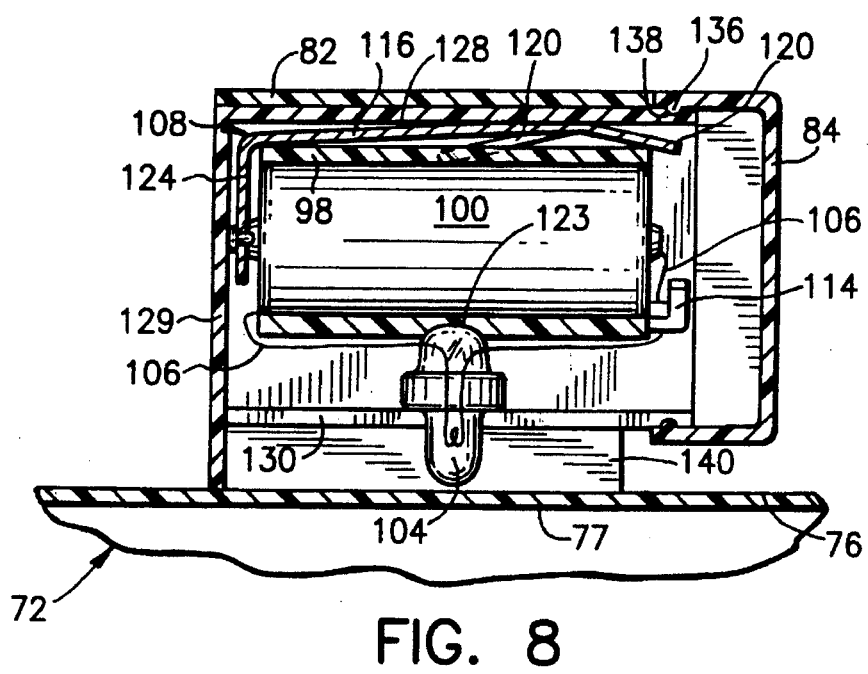
FIG. 8 is an enlarged vertical section taken along line 8—8 of FIG. 7.

FIGS. 7 and 8, vertical sections taken respectively along line 7—7 and line 8—8 through housing 78 of FIG. 6, show the battery holder 98 and conductive member 108 assembly in case 88 having a flexible top wall 128, which case in turn is inserted in a tight fit in housing 78 having a substantially rigid top wall 82, such that the tight fit causes housing top 82 to compress flexible case top wall 128 against conductive member 108 and cause switch arm 120 to contact the conductive casing of battery 102. FIGS. 7 and 8 show the base of bulb 104 seated in indentation 123 of battery holder 98 and the bulb's enlarged skirt 128 abutting against and supported on case bottom wall 130. The tip of bulb 104 extends through bottom wall slot 132 and is raised from the underlying portion of central panel 76 due to the length of leg extensions 140 of case side walls 126. FIG. 8 shows cover 86 having peripheral bead 136 which fits in groove 138 about the mouth of case 88 thereby frictionally holding the cover on the case. In FIGS. 6, 7 and 8, all or a portion of the portion 77 of central panel 76 which underlies case 88 or bulb 104 is at least partially transparent to light. The undersurface of bottom wall 130 may be coated with a reflective surface if desired.

FIG. 7A, an enlarged vertical section, with portions broken away, as would be taken along line 7—7 of FIG. 7, shows a modified closure of this invention, here 72' wherein all but a portion of the central panel 76' has been removed except for a peripheral ridge 77 which supports leg extensions 140 of case side wails 126. With this embodiment, light from bulb 104 (not shown) can pass directly into the interior of the container to which the closure might be secured. Preferably, when there is no interstitial container or panel portion between the bulb and interior of the container, the bottom wall includes a bulbous portion 53 which is transparent and which seals and protects the bulb from the interior of the container.

Figure 9:
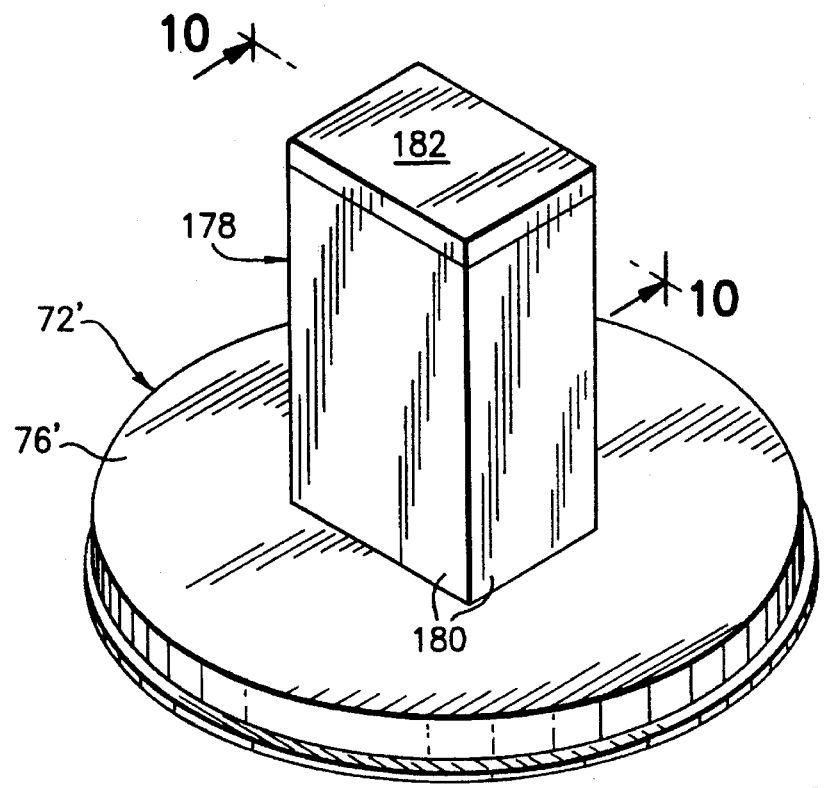
FIG. 9 is a perspective view of another embodiment of the closure of this invention.

FIG. 9, another embodiment of the closure of this invention, shows closure 72' whose central panel 76' has integral therewith or secured thereto another embodiment of a housing, here shown as 178, which extends upwardly from the central panel and is comprised of side walls 180 having a rim which defines an opening in a top open end of the housing, and an optional cover 182 which closes the top open end of the housing.

Figure 10:
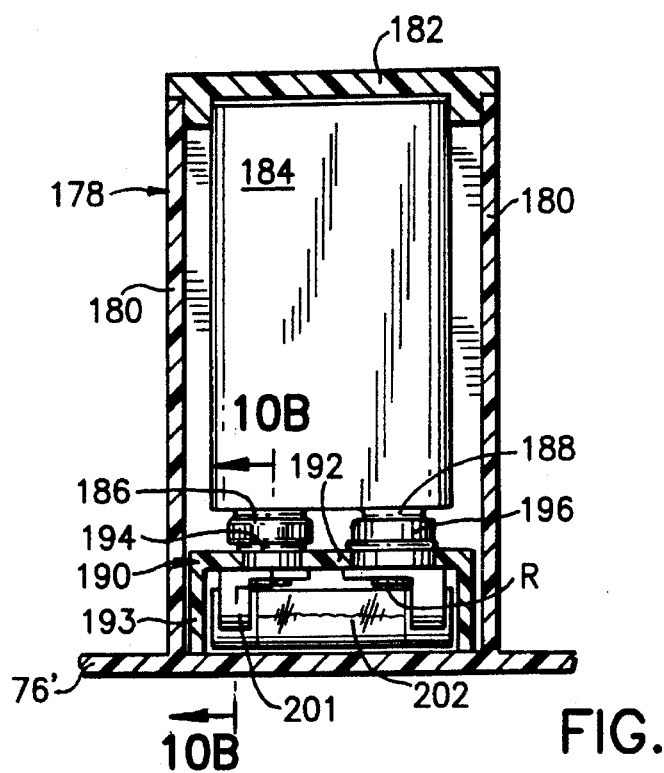
FIG. 10 is an enlarged vertical section, with portions broken away, taken along line 10—10 of FIG. 9.
Figure 10A:
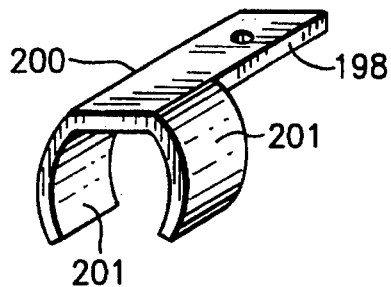
FIG. 10A is a perspective view of the clip shown in FIG. 10.
Figure 10B:
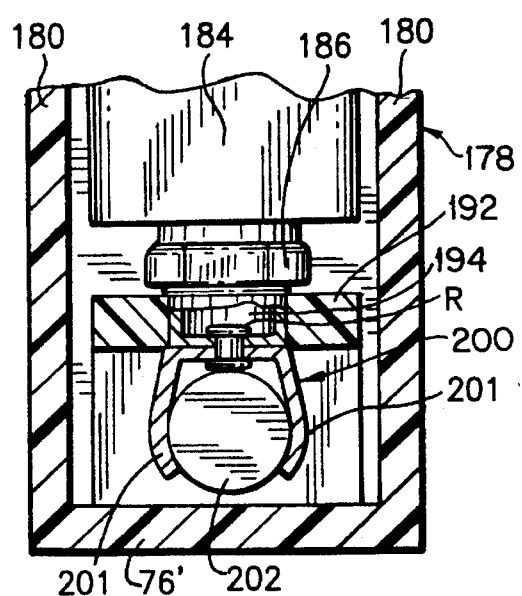
FIG. 10B is a vertical section, with protions broken away, taken along line 10B—10B of FIG. 10.

As shown in FIG. 10, a vertical sectional view through housing 178 of FIG. 9, and in FIGS. 10A and 10B, the housing in this embodiment has a bottom wall formed of a portion of closure central panel 76', and the housing walls form a chamber which communicates with the top open end of the housing and which holds or seats at least a portion of a light source therein, here, lighting means in the form of a 9-volt battery 184 having a female post 186 and a male post 188, and engaged or in contact therewith, suitable means for holding a light bulb. Such means here are snap-on lighting member, generally designated 190, comprised of a base 192 having fixed thereto a plug 194 and a receptor 196, respectively in contact with, and attached by suitable means such as rivets R to the extension 198 of each spring clip 200 whose arms 201 contact hold the metal end caps of a fuse-type light bulb 202. When plug 194 is plugged into female post 186 and receptor 196 receives male post 188, bulb 202 is energized and light is directed downwardly through the portion of central panel 76' which underlies housing 178 and which has a portion at least partially transparent to light. In this embodiment, battery 184 rests on and is supported by legs 193 of lighting member base 192 which in turn rest on the underlying at least partially transparent housing bottom wall portion of central panel 76'. In an alternative embodiment, legs 193 can be supported solely by a ridge similar to the one shown as 77 in FIG. 7A, or the batteries and the lighting member can be held or supported by other suitable means. The interior surface of base 192 and/or of legs 193 can have a reflective surface.

FIG. 10A shows a spring clip 200 comprised of an extension 198, having a hole therein on for receiving a rivet, and arms 201 for holding the metal end caps of a fuse bulb 202. FIG. 10B is an enlarged vertical sectional view taken along line 10B—10B of FIG. 10, showing the attachment of post 194 to base 192 by rivet R.

Figure 11:
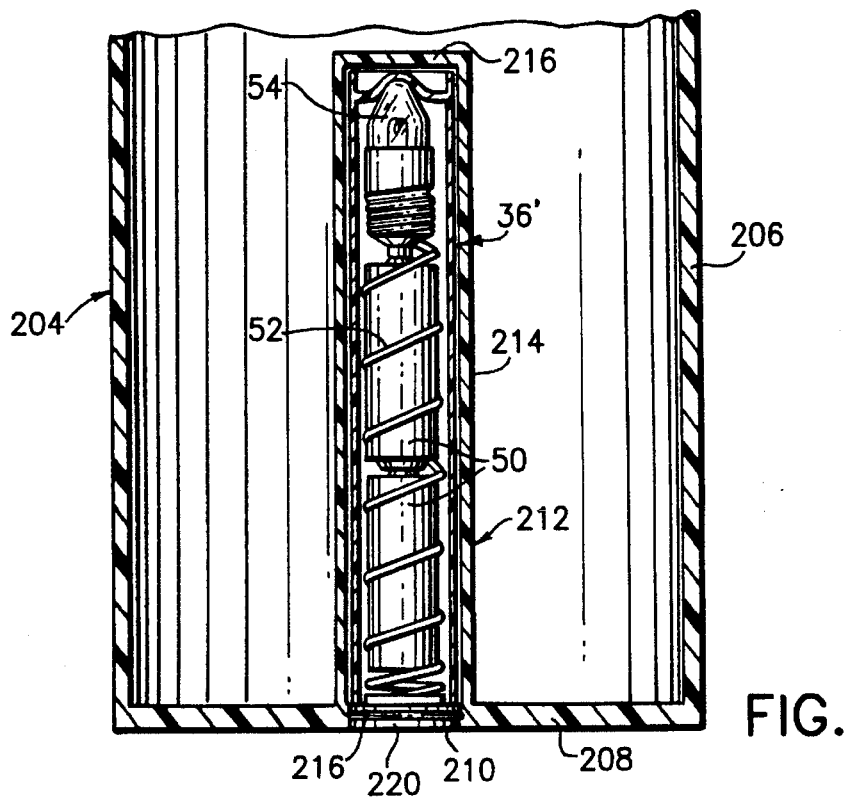
FIG. 11 is a vertical section, with portions broken away, and portions in side elevation, taken through another embodiment of the container of this invention.

FIG. 11 is a vertical section through the middle to bottom end of a broken away portion of a preferred embodiment of a container of this invention. More particularly, FIG. 11 shows a container, generally designated 204 comprised of a side wall 206 and a bottom wall 208 having an opening 210 therein and having associated therewith, a housing generally designated 212, having a side wall 214 and an integral top wall 216, which form a chamber 218 for receiving a suitable light source such as elongated flashlight 36' which is similar to flashlight 36 shown in FIGS. 3 and 4, except that flashlight 36' has no inner cap or overcap, but instead is held in the housing by plug 220 having an outwardly extending bead 216 frictionally engaged in a groove in the bottom wall rim of opening 210. Plug 220 biases coil spring 52 toward bulb 54 which is stopped by end wall 42 and keeps batteries 50, coilspring 52 and bulb 54 in contact thereby energizing bulb 54 to direct light upwardly at least through top wall 216, which is at least partially transparent to light, into the interior of container 204. Likewise, the end portion of flashlight 36' and of housing 212 can also be similarly tranparent to light. Of course, housing 212 can be of any suitable size or shape to hold any suitable light source, such as a 9-volt battery and lighting member.

Figure 12:
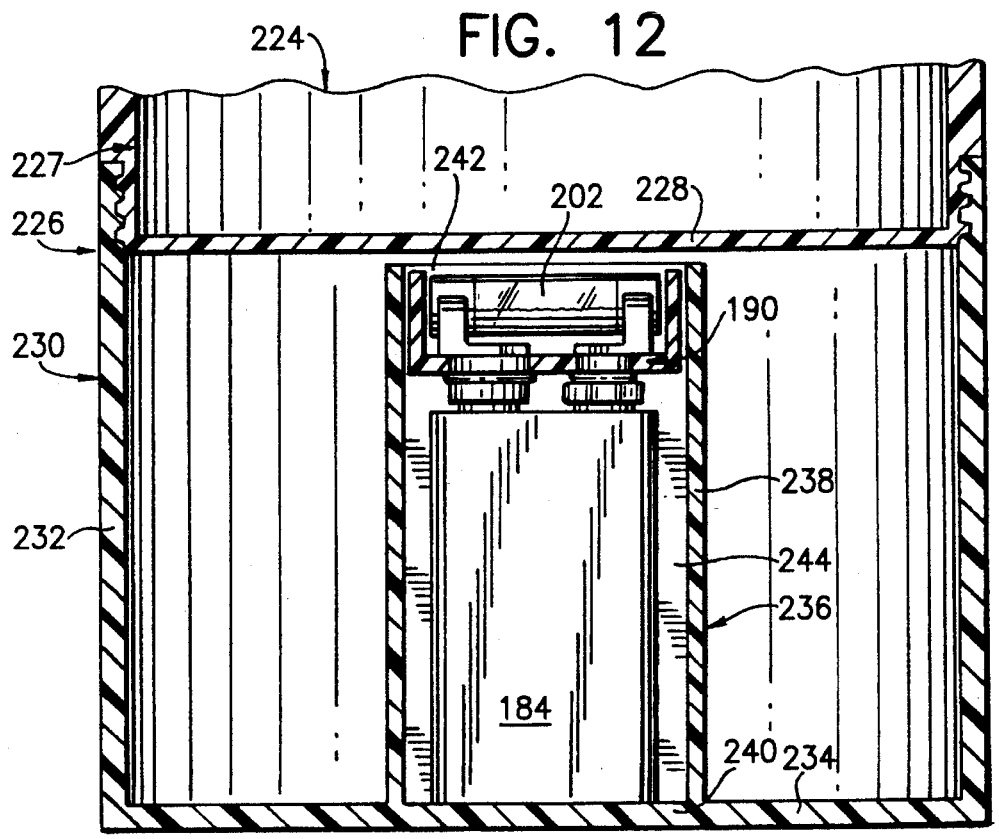
FIG. 12 is a side view of another embodiment of the container of this invention, with portions broken away, and with portions in side elevation and in vertical section.

FIG. 12 is a vertical section through the middle to bottom portion of another embodiment of the container of this invention. FIG. 12 shows a container or container body, generally designated 224 having a bottom, generally designated 226, comprised of a threaded bottom end portion 227 of the container body which has a bottom wall, here referred to as a primary bottom wall 228, and a base portion 230 in turn comprised of side walls 232 whose top end portion is threaded and is threadedlly or otherwise suitably engaged with the bottom end portion 227 of container body 224, and of a secondary bottom wall or base wall 234. Base wall 234 has associated, here integral therewith, a housing 236 comprised of side wall 238 and a bottom portion 240 of secondary bottom wall 234. Housing 236 has an open top end 242. When base portion 230 is separated from container body 224, a suitable light source such as a 9-volt battery 184 and an attached lighting member 190 combination is deposited through the open top of the housing into chamber 244, so that Light is directed From bulb 202 through an at least partially transparent portion of primary bottom wall 228 into the interior of the container.

Figure 13:
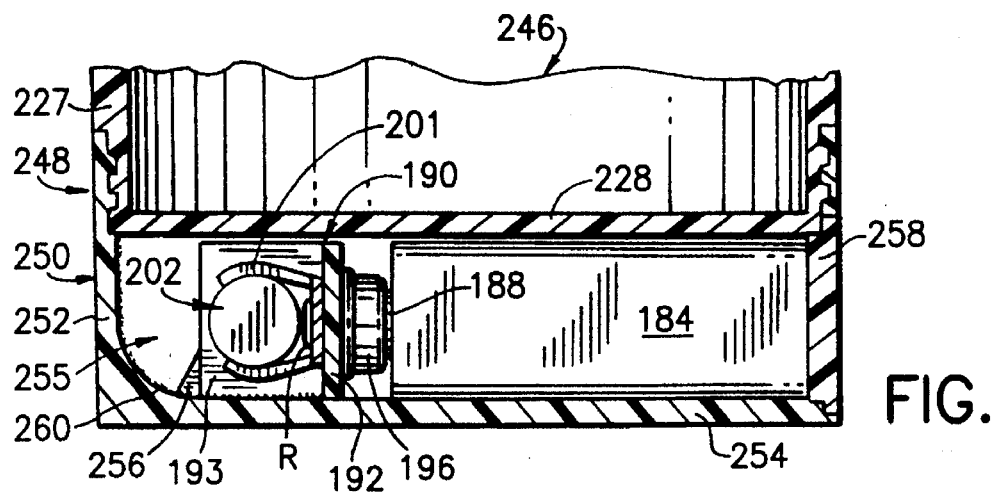
FIG. 13 is a side view like that of FIG. 12 but of another embodiment of the container of this invention, as would be seen along line 13—13 of FIG. 14.
Figure 14:
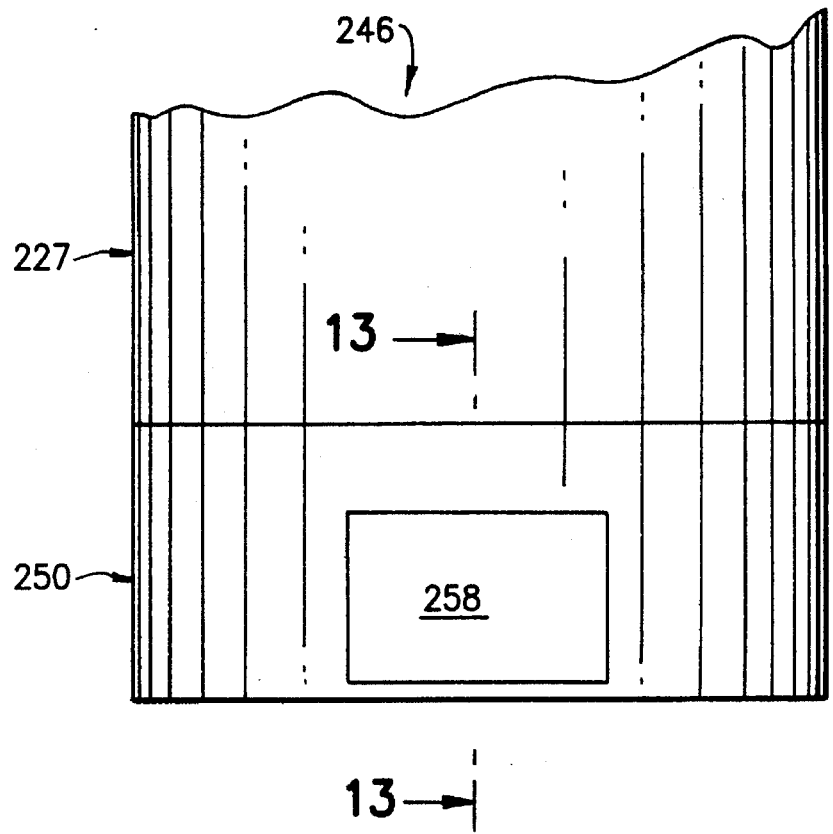
FIG. 14 is a side elevational view of another embodiment of the container of this invention.

FIG. 13 is a vertical section through the lower portion of the embodiment of the container of this invention shown in FIG. 14. More particularly, FIG. 13 shows a container or container body, generally designated 246, similar to container 224 of FIG. 12 and having a bottom generally designated 248, but here comprised of a base portion 250 in turn comprised of side wall 252 and a base wall or secondary bottom wall 254. The base portion includes or comprises the holding means, here housing 255 formed by these walls and which here includes a pair of stop members wall 256 (one shown) on bottom wall 254 and plug 258 for holding a light source such as a 9-volt battery 184 therebetween. Battery 184 has snapped onto its posts (only 188 shown) a snap-on lighting member 190 the legs of whose base member 192 each abutt a stop member 256. The inner surface of the side and bottom walls of base portion 250 can, as shown, can have a reflective surface such as provided by a reflective coating 260. In FIG. 13, base portion 250, utilizing or not utilizing primary bottom wall 228, forms a housing for the light source which can be deposited or slid into place while base portion is separated from the container body 246, or when plug 258 is removed.

FIG. 14 is a side elevational view showing plug 258 in base portion 250 of container 246.

Figure 15:
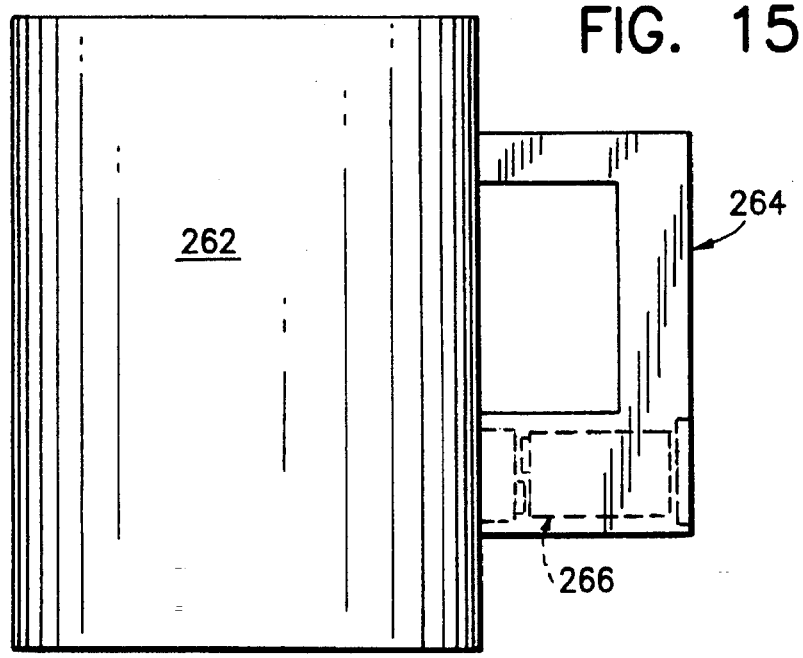
FIG. 15 is a side elevational view of another embodiment of the container of the invention.

FIG. 15, a side elevational view of another embodiment of the container of this invention, here shown as a container 262 having an adjoining handle 264 wherein the means for holding a light source, here housing 266, is associated with or located in the handle.

Figure 16:
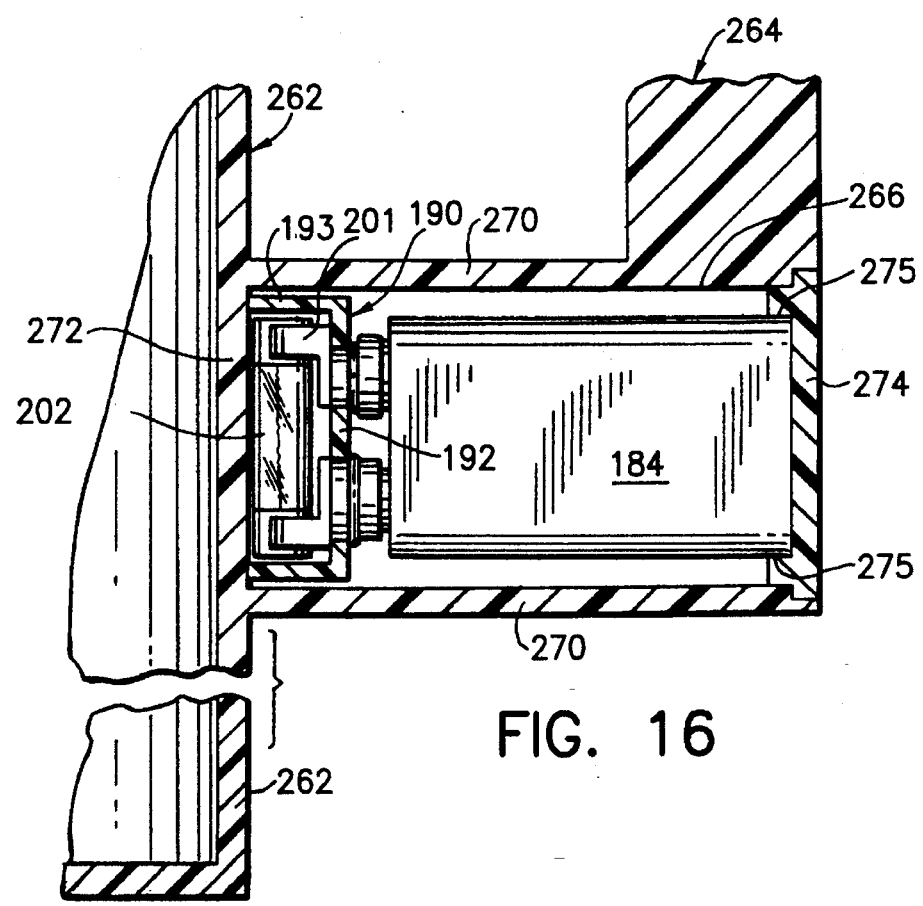
FIG. 16 is an enlarged vertical section, with portions broken away, taken through the lower portion of the handle shown in FIG. 15.

As shown in FIG. 16, an enlarged view of the lower portion of handle 264 of FIG. 15, housing 266 is formed by side walls 270, plug 274, and forward end wall 272, which is a portion of the side wall of container 262 and includes a portion which is at least partially transparent to tight. The light source is here shown as the 9-volt battery 184 snap on lighting member 190 combination shown in FIG. 10. The combination can be held tightly between end wall 272 and the cutout 275 in plug 274.

Figure 17:
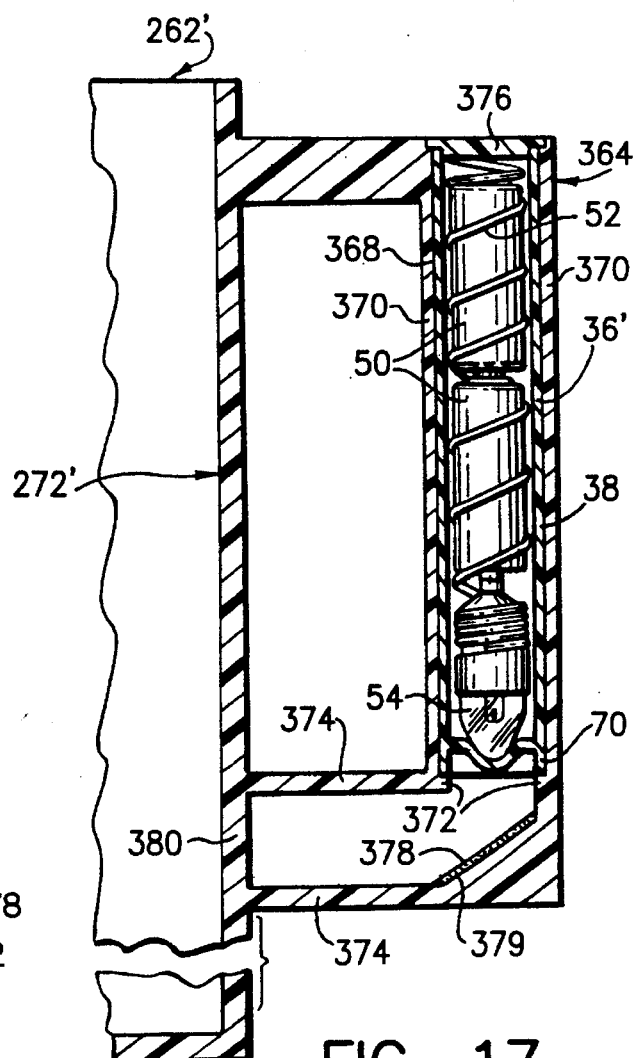
FIG. 17 is vertical section, with portions broken away, taken through the handle of another embodiment of the container of this invention.

FIG. 17, a vertical section through another embodiment of the container of this invention, shows a container 262' having a side wall 272', and a handle 364 which includes the means for holding a light source, here shown as a housing, generally designated 368, comprised of side walls 370, bottom ridge 372 of bottom wall 374 and the inside surface of plug 376. The light source is an elongated flashlight 36' like the one shown in FIG. 11, but inverted in FIG. 17. The legs 70 of flashlight case 38 are supported on ridge 372. Plug 376 is made of any suitable flexible resilient or depressable rubber, polymeric or elastomeric material or construction such that thumb pressure or other pressure exerted on plug 376 pushes a portion of the plug down, thereby biasing coil spring 52 and bringing the coil spring, batteries and bulb into contact and thereby energizing bulb 54 as desired. The light from bulb 54 is reflected off of reflective coating 378 on the angular surface 379 of bottom wall 374 and is directed through an at least partially transparent portion of side wall portion 380 or of wall 374 into container 262'.

It is to be understood that the means for holding the light source can be associated with or part of the container side wall. For example, the holding means or housing can be like that shown in FIG. 16, except that it is considered to be part of the side wall and the outwardly extending portion of side wall 270 in FIG. 16 would not be part of handle 274.

Figure 18:
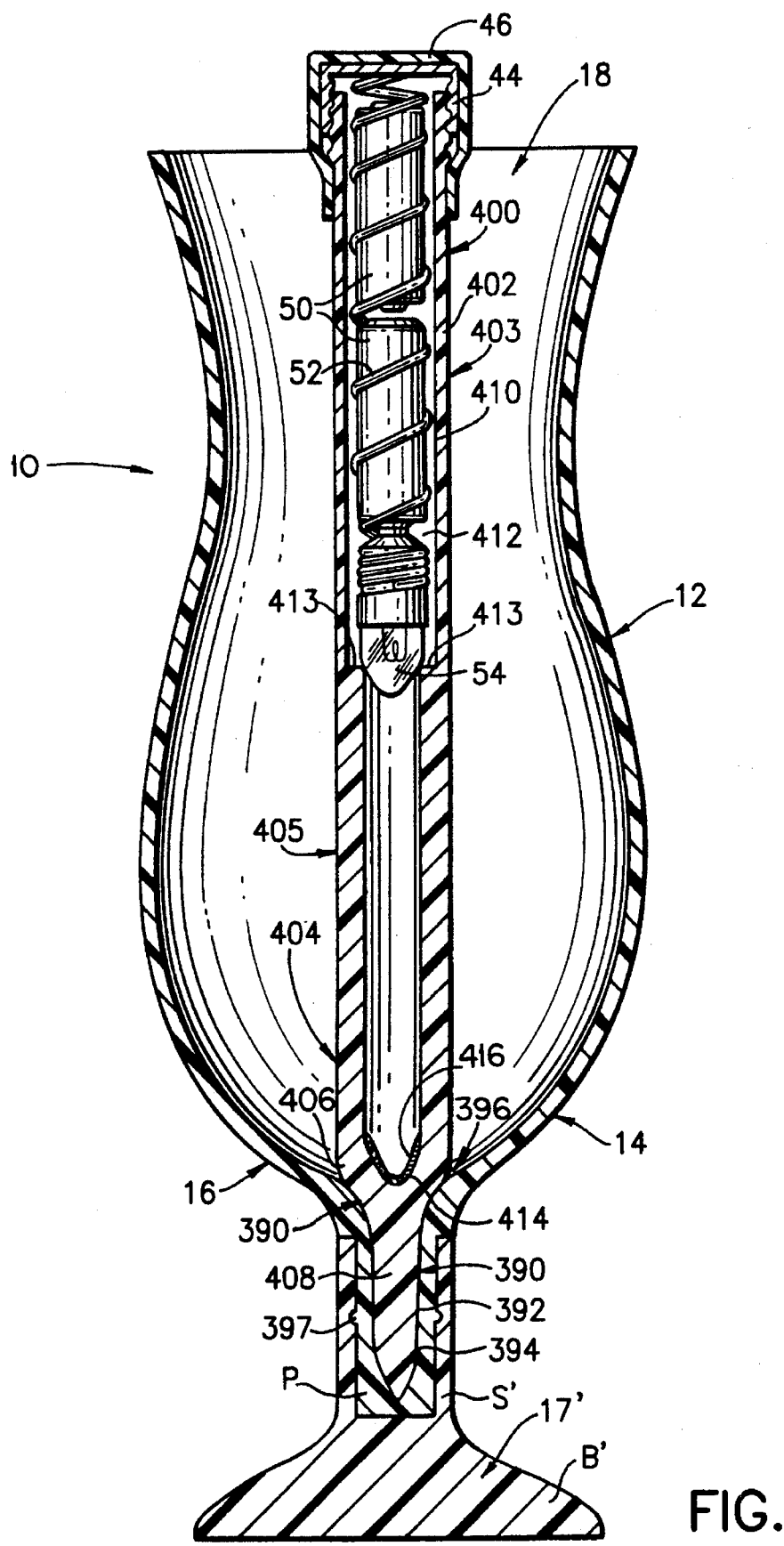
FIG. 18 is a vertical section through another embodiment of the container of this invention.

FIG. 18, a vertical section through another embodiment of a container of this invention, shows container 10 of FIG. 1 wherein its bottom 14 includes holding means, here shown as including a housing 390 whose wall 392 defines a chamber 394 which extends in a downward direction away from container the top open end 18, the chamber communicating with and including aperature 396 in the container bottom wall. Bottom wall 16 includes a depending post P in which a portion of the housing is formed, the post being adapted to be held as by its bead 397 in the groove of stem S' of base B' of base portion 17'. FIG. 18 shows a light source or lighting device 28', itself in the form of a case or container 400, having a sidewall 402, and a bottom 404 which includes bottom wall 406 having a depending nose 508, preferably having a pointed end, a portion of the bottom wall and nose being friction held by housing 590. Container 500 includes means for holding a light source or lighting means, here shown as a housing, generally designated 403, formed in part by side wall 402 whose interior surface 410 defines chamber 412 adapted to house a light source or lighting means, here shown as including coil spring 52, batteries 50 and light bulb 54. Housing 403 includes a support, which can be a bottom wall or wall portion, here shown as support ridge 413, for supporting the lighting means. The container has an interior portion and, preferably, a portion or all of the interior of the container which is below the lighting means, support or chamber, usually at least from the middle to the lower end or bottom of the container, can be solid, or hollow or a combination thereof. If it is hollow, it can have an arcuate bottom interior surface 414 which can have a reflective coating 416 thereon. Container or case 400 can be closed at its top open end by a metal inner cap 44 and a plastic over cap 46 as in FIG. 3, such that the light can be energized as described in relation to FIG. 3. At least a portion of bottom end portion 405 of case or container 400, whether solid or hollowed, preferably is at least partially transparent to light.

FIG. 19 shows an alternative embodiment of the container 400 of FIG. 18, here shown as 400' wherein like parts are numbered with like numbers but primed in FIG. 19. More particularly, FIG. 19 shows container 400' whose chamber 412' houses lighting device 28 such that light is emitted out of its lower end portion into the interior of the container i.e. into chamber 412' and/or into the interior of and through bottom 404' and, as desired, through depending tapered nose or nose portion 408'. A plug 274' closes the open end of container 400'.

FIG. 20 shows a container 400" having a side wall 402" housing 403", and a chamber 412" wherein side wall 402" frictionally holds the bead about the bottom end portion of lighting device 28 such that light is emitted into the interior of the container, i.e. into chamber 412" and/or into the interior of and through bottom 404" and, as desired, through depending tapered nose or nose portion 408".

FIG. 21 shows a container 400''' similar to that shown in FIG. 19, whose housing 403''' and chamber 412''' house or hold an upright lighting device 28' having a bulb (not shown) enclosed in a transparent plastic bulbous wall 53. The container has threadly secured thereto, an arcuate lid 418 whose undersurface can have a reflective coating 420 thereon, and whose depending member(s) 422 is or are transparent.

Although the chamber can be in any suitable portion of the container of this invention, as shown in FIGS. 18 through 21, preferably, it and the support are in an upper portion of the container embodiment, and the outer profile of the container portion below the chamber or support is tapered to a small nose, and is hollowed or solid or a combination thereof.

As shown in the drawings, the means for holding the light source to illuminate the inside of the container or closure can be any suitable means for use with or on or in connection with a container or closure. Although preferably it is part of or formed or molded of or in any portion of the container or its closure, the holding means can be or include a device or member secured or attached to the container or closure and/or light source itself by any suitable means such as an adhesive, tape(s) or VELCRO® band or tape system, or by magnets, latches, etc. The holding means can also be or be part of or formed in or of a device or member with which the container is used, for example as shown in FIGS. 18–21, and for example, a coaster on or in which the container is placed. Preferably, the holding means is or includes a housing which includes a cavity or chamber for holding e.g. seating the light source therein. As shown and disclosed herein, the housing can be formed of or in any part of the container, including the closure, a handle or side wall or bottom wall or base portion. The housing can be of any suitable or decorative shape. For example, it can be molded in a shape to resemble or advertise the building or establishment in which the container is being used, or a business' trademark, tradename or logo. Though not specifically shown, it is clearly within the scope of this invention, for example that a light source such as elongated flashlight 36 could be housed in stem S or base B of FIG. 1. The holding means includes and/or is used in association with a portion of the container which is at least partially transparent to light, to allow light to pass from the light source to illuminate the interior of the container. The container portion or other portions of the container of light source can be adapted to give special colors, combinations, patterns or effects.

The light source can be any suitable means for producing or emitting light, i.e. any suitable lighting means, and it can include a case or include or be a flashlight or the container of this invention. An example of a suitable source of light is disclosed in U.S. Pat. No. 4,032,773, whose disclosure is incorporated herein by reference. The Light source can be activated or energized by any suitable means, and the light emitted can be steady, flashing, moving or provide other special effects.

The container and/or closure can be made of any suitable material, for example, glass, or preferably structural polymeric materials, such as polyethylenes, polypropylenes or combination thereof. Preferably, the container is rigid.

Various modifications and variations of the container, closure, holding means and lighting device of the present invention may be made within the spirit of the invention and scope of the following claims.

What is claimed is:

1. A closure for a drinking container having an open end, the closure having a central panel portion which is frusto-conical and has a top end portion and a lower end portion, the top end portion being of a smaller diameter than the lower end portion and having an opening therein defined by a ledge of the closure for holding a removable light source in the opening to illuminate the inside of the container, and means for attaching the closure to the container such that light from the light source is detected into the open end of the drinking container when the closure is attached thereto.

2. The closure of claim 1, wherein the light source is removably held by the ledge.

3. The closure of claim 2 wherein the light source is a lighting device which has a protruding portion and is positioned in the opening and removably held there by the engagement of its protruding portion with the closure ledge.

4. The closure of claim 3 wherein the lighting device is battery-operated.

5. A closure for a drinking container, having means for attaching the closure to the drinking container, a central panel which includes an opening therein defined by a ledge in the closure, and a housing having one of more side walls having a lower end portion and an upper end portion in communication with the opening, the side walls depending downwardly from the closure so that the housing has a top open end which communicates with and is at least partially comprised of the opening, and such that the housing walls define a chamber for removably receiving a light source through the opening, the housing having a portion which allows light to pass therethrough and the closure having means for removably holding the light source in the chamber such that light from the light source is directed into the drinking container when the closure is attached thereto.

6. The closure of claim 5 wherein the housing has a bottom wall portion in communication with the side wall lower end portion and the holding means includes the bottom wall portion.

7. The closure of claim 6 wherein the light source is removable, battery-operated and held by the holding means.

8. The closure of claim 5 wherein the holding means includes the ledge.

9. The closure of claim 8 wherein the light source is removable, battery-operated and held by the holding means.

10. A closure for a drinking container having means for attaching the closure to the drinking container, a central panel which includes an upwardly extending housing having side walls which communicate with the central panel, extend upwardly therefrom, define a chamber and have a rim which defines an opening in the housing above the central panel and which communicates with the chamber, the chamber and opening being adapted to removably receive a light source, the housing having means for removably holding the light source in the chamber, the central panel having means below the housing to allow light to pass through the central panel, and the means for holding the light source in the housing being such that light from the light source is directed into the drinking container when the closure is attached thereto.

11. The closure of claim 10 wherein the light source removably held by the holding means.

12. The closure of claim 11 wherein the light source is battery-operated.

13. The closure of claim 10 wherein a portion of the central panel forms a housing bottom wall portion, and the holding means includes the bottom wall portion.

14. The closure of claim 13 wherein the opening is at the top end of the housing.

15. The closure of claim 14 wherein the holding means includes the rim of the housing.

16. The closure of claim 10 wherein the opening is at the side of the housing.

17. The closure of claim 16 wherein the housing includes a light source held by the holding means.

18. The closure of claim 17 wherein light source is battery-operated.

* * * * *